United States Patent Office 3,711,454
Patented Jan. 16, 1973

3,711,454
SYNERGISTIC PEROXIDE/OXIME/ISOCYANATE CURING SYSTEM
Teruyoshi Usamoto, Higashi-Osaka, and Tamotu Kondo, Toyonaka, Japan, assignors to Sumitomo Chemical Company, Limited, Osaka, Japan
No Drawing. Filed Aug. 6, 1970, Ser. No. 61,802
Claims priority, application Japan, Aug. 11, 1969, 44/63,667
Int. Cl. C08f 15/40, 15/04
U.S. Cl. 260—80.78                 4 Claims

ABSTRACT OF THE DISCLOSURE

A method for manufacturing a vulcanizate of an ethylene-propylene copolymer (hereinafter referred to as EPM) or an ethylene-propylene-nonconjugated diene terpolymer (hereinafter referred to as EPDM) with improved heat resistance is disclosed, in which an isocyanate compound and an oxime compound are used as coagents in a peroxide curing system for an ethylene-propylene copolymer or an ethylene-propylene-nonconjugated diene terpolymer.

---

It has been said that in the cured state EPM and EPDM are superior to other rubbers in physical properties such as, for example, ozone, weathering and heat resistance. However, the heat resistance of such products is not always satisfactory, and it is difficult to use them continuously at temperatures higher than 150° C. This disadvantage has prevented EPM and EPDM in making inroads into areas where good heat resistance is required.

In general, the heat resistance of EPM and EPDM varies in a wide range depending upon the compounding formula of the curing system used. For instance, in a sulfur curing system for EPDM, a decrease in the amount of sulfur or an increase in the amount of zinc oxide have been proposed for improving the heat resistance.

In a peroxide curing system it has been widely known that though curing with an organic peroxide alone gives a vulcanizate with a heat resistance inferior to that obtained by a sulfur curing system, the heat resistance of vulcanizates of EPM and EPDM is increased by using an organic peroxide in combination with various coagents, such as sulfur, maleimide compounds, acrylate compounds, oxime compounds. However, even these curing systems do not give sufficient heat resistance to such vulcanizates.

In accordance with this invention, vulcanizates of EPM and EPDM are made by using a curative system comprising an organic peroxide in combination with an isocyanate compound and an oxime compound as coagents. The product is a vulcanizate of EPM or EPDM with good heat resistance at high temperatures for long periods of time. The curing system is used in an amount sufficient to obtain a satisfactory vulcanizate.

The EPM and EPDM used in the present invention are made in known ways by using catalysts, particularly those of the Ziegler-Natta type, well known to the art.

A suitable EPM comprises an ethylene-propylene copolymer containing 2 to 20% by weight of ethylene. Such EPM may be obtained as a soluble polymer from a polymerization medium used in the production of a crystalline ethylene-propylene copolymer by using a coordination catalyst of the Ziegler-Natta type, or as an ethylene-propylene amorphous copolymer containing 50 to 90% by weight of ethylene by using a coordination catalyst of the Ziegler-Natta type.

EPDM is a polymer composed of 40 to 80% by moles of ethylene, 60 to 20% by moles of propylene and 0.3 to 10% by moles of a nonconjugated diene, and may be obtained by using a coordination catalyst of the Ziegler-Natta type. Representative nonconjugated dienes used as a third monomer of such an EPDM are: 1,4-hexadiene, dicyclopentadiene, 5 - methylene - 2 - norbornene, 5-ethylidene-2-norbornene, 4,7,8,9-tetrahydroindene, etc.

Organic peroxides which may be used are: dicumyl peroxide, 2,5-dimethyl-2,5-di (tert-butylperoxy) hexane, 2,5-dimethyl-2,5-di (tert-butylperoxy) hexyne, di-tert-butyl peroxide, tert-butyl hydroperoxide, cyclohexane peroxide, tert-butyl perphthalate, 1,3-di-tert-butyl-peroxydiisopropylbenzene, etc.

Isocyanate compounds which may be used are commercially available polyisocyanates or prepolymers thereof, such as tolylene diisocyanate, 4,4'-diphenylmethane diisocyanate, crude diphenylmethane diisocyanate, polymethylenepolyphenylisocyanate, toluidine diisocyanate, 1,5-naphthalene-diisocyanate, etc.

Oxime compounds which may be used are p-quinone dioxime, p,p'-dibenzoylquinone dioxime, etc. Particularly useful are quinone dioximes and compounds thereof wherein the H of an oxime group is replaced by an acyl group having 2 to 12 carbon atoms. Mono- and diesters may be used, such as, for example, acetate, benzoate, malate, maleate, toluate, propionate, butyrate and laurate.

The amounts of accelerator used are 0.2 to 15 parts, preferably 0.3 to 10 parts, by weight, of the isocyanate compound, and 0.2 to 20 parts, preferably 0.3 to 15 parts, by weight, of the oxime compound per 100 parts by weight of EPM or EPDM. Typically, the amount of peroxide compound used is from 0.2 to 20 parts by weight, preferably 0.5 to 10 parts, based on 100 parts EPM or EPDM.

Optionally, fillers, processing oils, zinc oxide, stearic acid, antioxidants, pigments or the like may be added to the EPM or EPDM before vulcanization. Mixing of the organic peroxides, isocyanate compounds, oxime compounds, and other additives, if any, into EPM or EPDM can be carried out in well known ways by means of, for example, a two-roll mill or a Banbury mixer. The methods for curing or vulcanizing include compression molding using a heated press, and direct or indirect curing using steam. The curing temperature is typically 120° to 210° C.

The invention is illustrated by the following examples.

EXAMPLE 1

100 parts by weight of EPDM (Royalene 301, produced by Uniroyal, Inc. and made from ethylene, propylene and dicyclopentadiene) was admixed with 100 parts by weight of SRF black, 10 parts by weight of process oil, 20 parts by weight of zinc oxide, 1 part by weight of stearic acid, 7 parts by weight of dicumyl peroxide (Di-cup 40C, produced by Hercules, Inc.), 1 part by weight of crude diphenylmethane diisocyanate (Desmodur 44 ∇, produced by Bayer), and 1 part by weight of p,p'-dibenzoylquinone dioxime, and milled on a mixing mill. The mixed compound was cured in a press at 160° C. for 30 minutes.

The tensile strength, elongation and hardness of the vulcanizate were measured in accordance with JIS K-6301.

The tensile strength, elongation and hardness of the vulcanizate after being aged in an aging tester of the test-tube type were measured in accordance with JIS K-6301, and the heat resistance of the vulcanizate was expressed as the respective ratios of the tensile strength, elongation and hardness of the vulcanizate after aging to those before aging.

The results were as shown in Table 1.

TABLE 1

|  | Comparative examples | | | Invention |
|---|---|---|---|---|
| Composition for curing (parts by weight): | | | | |
| EPDM (Royalene 301) | 100 | 100 | 100 | 100 |
| Stearic acid | 1 | 1 | 1 | 1 |
| Zinc oxide | 20 | 20 | 20 | 20 |
| SRF black | 100 | 100 | 100 | 100 |
| Process oil | 10 | 10 | 10 | 10 |
| Dicumyl peroxide (Di-cup 40C) | 7 | 7 | 7 | 7 |
| Sulfur | 0 | 0.3 | 0 | 0 |
| p,p'-Dibenzoylquinone dioxime | 0 | 0 | 2 | 1 |
| Crude diphenylmethane diisocyanate (Desmodur 44▽) | 0 | 0 | 0 | 1 |
| Physical properties of the vulcanizate: | | | | |
| Tensile strength (kg./cm.²) | 160 | 190 | 181 | 180 |
| Elongation (percent) | 300 | 350 | 310 | 320 |
| Hardness Shore A | 77 | 79 | 78 | 78 |
| Heat resistance: | | | | |
| Residual tensile strength (percent): | | | | |
| Aged for 70 hrs. at 150° C | 78 | 85 | 87 | 95 |
| Aged for 300 hrs. at 150° C | (¹) | (¹) | 60 | 80 |
| Residual elongation (percent): | | | | |
| Aged for 70 hrs. at 150° C | 35 | 50 | 65 | 85 |
| Aged for 300 hrs. at 150° C | (¹) | (¹) | 41 | 65 |
| Change in hardness: | | | | |
| Aged for 70 hrs. at 150° C | +5 | +6 | +4 | +2 |
| Aged for 300 hrs. at 150° C | (¹) | (¹) | +8 | +5 |

¹ Physical property was unable to be measured owing to the hardening of the specimen.

EXAMPLE 2

100 parts by weight of EPDM (Royalene 501, produced by Uniroyal, Inc. and made from ethylene, propylene and ethylidene norbornene) was admixed with 50 parts by weight of HAF black, 10 parts by weight of process oil, 20 parts by weight of zinc oxide, 1 part by weight of stearic acid, 7 parts by weight of dicumyl peroxide (Di-cup 40C, produced by Hercules, Inc.), 1 part by weight of polymethylene polyphenylisocyanate (PAPI, produced by the Upjohn Co.) and 1 part by weight of p-quinone dioxime, and milled on a mixing mill. The mixed compound was treated in the manner similar to that in Example 1, and the physical properties were measured. The results were as shown in Table 2.

TABLE 2

|  | Comparative examples | | | Invention |
|---|---|---|---|---|
| Composition for curing (parts by weight): | | | | |
| EPDM (Royalene 501) | 100 | 100 | 100 | 100 |
| Stearic acid | 1 | 1 | 1 | 1 |
| Zinc oxide | 20 | 20 | 20 | 20 |
| HAF black | 50 | 50 | 50 | 50 |
| Process oil | 10 | 10 | 10 | 10 |
| Dicumyl peroxide (Di-cup 40C) | 7 | 7 | 7 | 7 |
| Sulfur | 0 | 0.3 | 0 | 0 |
| p-Quinone dioxime | 0 | 0 | 2 | 1 |
| Polymethylene polyphenylisocyanate (PAPI) | 0 | 0 | 0 | 1 |
| Physical properties of the vulcanizate: | | | | |
| Tensile strength (kg./cm.²) | 200 | 210 | 205 | 203 |
| Elongation (percent) | 300 | 340 | 330 | 320 |
| Hardness (Shore A) | 74 | 74 | 74 | 74 |
| Heat resistance: | | | | |
| Residual tensile strength (percent): | | | | |
| Aged for 70 hrs. at 150° C | 48 | 80 | 84 | 93 |
| Aged for 300 hrs. at 150° C | (¹) | (¹) | 55 | 70 |
| Residual elongation (percent): | | | | |
| Aged for 70 hrs. at 150° C | 40 | 70 | 75 | 99 |
| Aged for 300 hrs. at 150° C | (¹) | (¹) | 50 | 92 |
| Change in hardness: | | | | |
| Aged for 70 hrs. at 150° C | +4 | +5 | +4 | +1 |
| Aged for 300 hrs. at 150° C | (¹) | (¹) | +8 | +3 |

¹ Physical property was unable to be measured owing to the hardening of the specimen.

EXAMPLE 3

100 parts by weight of EPM (ethylene content, 45% by moles; Mooney viscosity, $ML_{1+4}$ at 100° C., 40) was admixed with 50 parts by weight of HAF, 5 parts by weight of process oil, 20 parts by weight of zinc oxide, 1 part by weight of stearic acid, 7 parts by weight of dicumyl peroxide (Di-cup 40C, produced by Hercules, Inc.), 1 part by weight of crude diphenylmethane diisocyanate (Desmodur 44▽, produced by Bayer) and 1 part by weight of p,p'-dibenzoylquinone dioxime, and milled on a mixing mill. The mixed compound was cured in a press at 160° C. for 30 minutes. Then, physical properties were measured in the manner similar to that in Example 1. The results obtained were as shown in Table 3.

TABLE 3

|  | Comparative examples | | | Example |
|---|---|---|---|---|
| Composition for curing (parts by weight): | | | | |
| EPM | 100 | 100 | 100 | 100 |
| Stearic acid | 1 | 1 | 1 | 1 |
| Zinc oxide | 20 | 20 | 20 | 20 |
| Process oil | 5 | 5 | 5 | 5 |
| Dicumyl peroxide (Di-cup 40C) | 7 | 7 | 7 | 7 |
| Sulfur | 0 | 0.3 | 0 | 0 |
| p,p'-Dibenzoylquinone dioxime | 0 | 0 | 2 | 1 |
| Crude diphenylmethane diisocyanate (Desmodur 44▽) | 0 | 0 | 0 | 1 |
| Physical properties of the vulcanizate: | | | | |
| Tensile strength (kg./cm.²) | 145 | 160 | 148 | 150 |
| Elongation (percent) | 380 | 400 | 340 | 330 |
| Hardness (Shore A) | 72 | 73 | 74 | 74 |
| Heat resistance (aged for 150 hrs. at 150° C): | | | | |
| Residual tensile strength (percent) | 31 | 64 | 75 | 89 |
| Residual elongation (percent) | 10 | 31 | 70 | 87 |
| Change in hardness | +8 | +8 | +4 | +2 |

Having thus described our invention, what we claim and desire to protect by Letters Patent is:

1. A method for manufacturing a vulcanizate of an ethylene-propylene copolymer or an ethylenepropylene-non-conjugated diene terpolymer comprising vulcanizing an ethylene-propylene copolymer or an ethylenepropylene-non-conjugated diene terpolymer with a curing system comprising 0.2 to 20 parts by weight of an organic peroxide compound, 0.3 to 10 parts by weight of a polyisocyanate compound and 0.2 to 20 parts by weight of an oxime compound, and all weight ranges are based on 100 parts by weight of the said copolymer or the said terpolymer.

2. The method of claim 1 wherein the polyisocyanate compound is an aromatic polyisocyanate.

3. The method of claim 1 wherein the oxime compound is a quinone dioxime or a compound thereof wherein the H of an oxime group is replaced by an acyl group having 2 to 12 carbon atoms.

4. A vulcanizate of an ethylene-propylene copolymer or an ethylene-propylene-non-conjugated diene terpolymer made by the method of claim 1.

References Cited

UNITED STATES PATENTS

| 2,983,714 | 5/1961 | Robinson | 260—79.5 |
| 3,084,141 | 4/1963 | Kraus | 260—85.1 |
| 3,226,356 | 12/1965 | Kehr | 260—41 |
| 3,329,650 | 7/1967 | Albin | 260—41.5 |
| 3,409,595 | 11/1968 | Muller | 260—77.5 |
| 3,478,004 | 11/1969 | Kehr | 260—80.78 |
| 3,553,176 | 1/1971 | Fujisaki | 260—78.4 |

JAMES A. SEIDLECK, Primary Examiner

R. S. BENJAMIN, Assistant Examiner

U.S. Cl. X.R.

260—41R, B, C, 88.2S, 77.5 CR